United States Patent [19]

Bellis et al.

[11] Patent Number: 4,715,967

[45] Date of Patent: Dec. 29, 1987

[54] COMPOSITION AND METHOD FOR TEMPORARILY REDUCING PERMEABILITY OF SUBTERRANEAN FORMATIONS

[75] Inventors: Harold E. Bellis; Edward F. McBride, both of Wilmington, Del.

[73] Assignee: E. I. Du Pont de Nemours and Company, Wilmington, Del.

[21] Appl. No.: 822,589

[22] Filed: Dec. 27, 1985

[51] Int. Cl.$^4$ .................. E21B 43/27; E21B 43/26
[52] U.S. Cl. .................. 252/8.551; 166/282; 166/283; 252/8.553
[58] Field of Search .................. 252/8.55 R, 8.55 C, 252/8.551, 8.553; 166/282, 283; 523/130; 524/599

[56] References Cited

U.S. PATENT DOCUMENTS

| | | | |
|---|---|---|---|
| 3,302,719 | 2/1967 | Fischer | 166/295 |
| 3,898,167 | 8/1975 | Crowe | 252/8.55 |
| 3,989,632 | 11/1976 | Fischer et al. | 252/8.55 |
| 4,526,695 | 7/1985 | Erbstoesser et al. | 252/8.55 |

OTHER PUBLICATIONS

Korshak et al., *Polyesters*, Pergamon Press, New York, 1965 (translated from Russian), pp. 86–105.

*Primary Examiner*—Herbert B. Guynn
*Attorney, Agent, or Firm*—Craig H. Evans

[57] ABSTRACT

This invention relates to a composition and method of temporarily reducing the permeability of subterranean formations penetrated by a wellbore. In particular, it relates to an inexpensive, low molecular weight condensation product of hydroxy acetic acid with itself or compounds containing other hydroxy-, carboxylic-acid-, or hydroxycarboxylic-acid moieties and method for preventing fluid loss during well treatment.

17 Claims, No Drawings

COMPOSITION AND METHOD FOR TEMPORARILY REDUCING PERMEABILITY OF SUBTERRANEAN FORMATIONS

TECHNICAL FIELD

This invention relates to a composition and method of temporarily reducing the permeability of subterranean formations penetrated by a wellbore. In particular, it relates to a low molecular weight oligomeric composition and method for preventing fluid loss during well treatment.

BACKGROUND AND SUMMARY OF THE INVENTION

At various times during the life of a well formed in a subterranean formation for the production of oil and gas, it is desirable to treat the well. Such treatments include perforating, gravel packing, fracturing, and acidizing. To perform these treatments, fluid loss control agents and diverting agents, also referred to as treatment agents in this specification, are used.

Although high fluid permeability is an important characteristic of a hydrocarbon-producing formation, high permeability will adversely affect the various treatments. During fracturing treatment, for example, it is desirable to control loss of the treating fluid to the formation so as to maintain a wedging effect and propagate the fracture. Therefore, the effective performance of some treatments of the wellbore require temporarily reducing permeability of formation strata to reduce the loss of treating fluid during the treatment. Several fluid loss control and diverting agents have been developed for use in these treatments, but many of them leave a residue in the wellbore or on the formation strata upon completion of the treatment. This residue can cause permanent damage to the production capability of the formation. Examples of materials used for reducing permeability include natural substances such as crushed limestone, rock salt, oyster shells, and silica flour. These relatively inert materials form a filter cake which may remain on the formation face and cause unwanted permanent pluggage. Other materials, such as salt, benzoic acid, and naphthalenes, have some water or oil solubility or may be sublimable. These materials are deficient in that it is often difficult to determine the well environment. Still other types of material include oil soluble, water insoluble materials such as soaps, gels, waxes, and resin polymers. These materials are intended to be removed by subterranean hydrocarbon fluids. However, contact with oil in microscopic rock pores is not guaranteed, thus, these materials may not be solubilized and permanent formation damage may occur.

The polyester polymers of hydroxy acetic acid with lactic acid are taught or claimed in U.S. Pat. Nos. 4,387,769 and 4,526,695, both being to Erbstoesser et al., as improved oil well treatment agents. These polymers were extensively studied in the 1950s as possible textile fibers until it was found that they readily hydrolized in the presence of heat and moisture. (See U.S. Pat. No. 2,676,945 to Higgins.) Erbstoesser et al. indicate that the polyester polymers are substantially insoluble in the wellbore fluid but degrade in the presence of water at elevated temperatures in about one to seven days to form oligomers which are at least partially soluble in the formation fluid and are readily removed from the well during production. These polyester polymers are expensive to manufacture and are of limited effectiveness in low temperature applications. A need still exists for a low cost fluid loss and diverting agent that has hydrolytic properties that permit use in oil wells having a broad range of ambient temperatures. This treatment agent must initially be insoluble in the wellbore fluid, must remain insoluble long enough to do the treatment, and should degrade quickly once the treatment is completed so that the well can be quickly returned to production. The treatment agent also should have a sufficiently high crystallinity and melting point to allow grinding to the desired particle size and to prevent melting or softening when being ground or used. Preferably, the treatment agent should be capable of being tailored to temperature conditions and desired timing of oil well treatment. That is, the time to degrade at a specific temperature should be adjustable. The present invention meets these requirements.

The composition of the present invention comprises an inexpensive, low molecular weight condensation product of hydroxy acetic acid with itself or compounds containing other hydroxy-, carboxylic-acid-or hydroxycarboxylic-acid moieties. The condensation products are friable solids with a melting point of greater than 150° C. and generally with a degree of crystallinity. They have a number average molecular weight of 200 to 4000 and preferably are oligomers having a number average molecular weight of about 200 to about 650. They are primarily trimers up through decamers. They are insoluble in both aqueous and hydrocarbon media but will degrade at specific rates in the presence of moisture and temperatures above about 120° F. to form soluble monomers and dimers. Rate of hydrolysis at a given temperature can be increased by incorporating small amounts of other molecules (usually less than 15% by weight) into the hydroxy acetic acid condensation reaction. These materials are usually flexible or more bulky molecules that partially disrupt crystallinity but leave the condensation product friable. Thus, the treatment agent can be tailored to adjust the rate of hydrolysis from a few hours to several days by controlling the amount and nature of the crystallinity.

DETAILED DESCRIPTION OF THE INVENTION

The composition of this invention comprises a wellbore fluid having dispersed therein a fluid loss control or diverting agent which comprises low molecular weight condensation products of (1) hydroxy acetic acid or of (2) hydroxy acetic acid cocondensed with up to 15% by weight of compounds containing hydroxy-, carboxylic-acid-, or hydroxycarboxylic-acid moieties, or combinations or blends thereof. The compounds containing the moieties with which the hydroxy acetic acid is cocondensed are referred to herein as modifying molecules. These modifying molecules include but are not limited to lactic acid, tribasic acids such as citric acid, dibasic acids such as adipic acid, diols such as ethylene glycol and polyols. They also include difunctional molecules such as 2,2-(bishydroxymethyl)-propanoic acid. Cocondensing hydroxy acetic acid with different modifying molecules produces varied physical and hydrolytic properties, thus permitting the treatment agent to be tailored to the oil well temperatures and treatment timing considerations. Compatible plasticizers may also be used to modify the crystalline character but have been less effective than the above-mentioned cocondensing molecules. Preferred modifying molecules are lactic acid, citric acid, 2,2-(bishydroxymethyl)propanoic acid, trimethylol-ethane, and adipic acid. The most preferred are lactic acid and citric acid. The condensation product has a number average molecular weight of 200 to 4000. Preferably the condensation product is an oligomer having a number average molecular weight of 200 to 650 and comprises primarily trimers up through decamers.

The treatment agent must be sufficiently hard or friable to allow it to be ground to small particle size and should have a high enough melting point to avoid softening and deforming during use and grinding. The percentages of hydroxy acetic acid and the cocondensed compounds can be controlled to achieve sufficient crystallinity and a high enough melting or softening point. The melting point should be greater than 150° C. Also, the time and temperature of condensation may be varied.

The condensation and cocondensation products of this invention are made by methods well known in the art. The hydroxy acetic acid may be heated alone or with the other cocondensing molecules discussed above in the presence of a catalyst such as antimony trioxide. The condensation is preferably carried out in an inert atmosphere and at 30 to 60 mm vacuum. By varying the percentages of hydroxy acetic acid and the cocondensed compounds as well as the temperatures and time of condensation, it is possible to tailor the condensation product to degrade at different rates for given wellbore temperatures. Different condensation and cocondensation products can be physically or melt blended to achieve a wider range of degradation rates.

The wellbore fluid can be comprised of water, oil, xylene, toluene, brines, water-in-oil emulsions, or oil-in-water emulsions. The amount of treatment agent required for successful fluid control will vary widely depending upon the size of the formation, the degree of permeability of the formation, the size of the treatment agent particle and other variables, such as wellbore fluid viscosity and permissible fluid loss volumes. However, it is believed that for the treatment agent particles ranging in size from 0.1 to 1500 microns that from about 1 to about 10 pounds of treatment agent per hundred barrels of wellbore fluid will be sufficient for most applications.

To use the wellbore fluid composition of this invention, one should first determine the temperature of the well. The treatment agent tailored to that temperature should be selected and blended with the wellbore fluid in the proper ratio. For well temperatures greater than 200° F., condensation products of hydroxy acetic acid alone may be used. For temperatures below 200° F. the crystallinity should be partially disrupted by cocondensing the hydroxy acetic acid with modifying molecules such as described above. When the wellbore fluid is injected into the formation, the treatment agent contained within it minimizes penetration of the treating fluid into the formation. After the treatment has been completed, the well may be allowed to heat back up to its ambient temperature. At this temperature in the presence of connate water the treatment agent will degrade to soluble or partially soluble monomers and dimers in from several hours to several days. These at-least-partially-soluble monomers and dimers can be readily removed from the well during production.

The following examples are merely illustrative of the present invention. Examples 1 to 8 set forth procedures for preparing condensation and cocondensation products of hydroxy acetic acid suitable for practice in the present invention. Examples 1A and 6A show the effect of post heating the condensation products of Example 1 and Example 6, respectively. All percentages are weight percentages.

The number average molecular weight for the condensation or cocondensation product of each example was determined by the following method:

METHOD FOR DETERMINING MOLECULAR WEIGHT

About 0.3 gm of condensation product is dissolved in 60 ml of dimethyl sulfoxide and the solution titrated to pH 8.0 with 0.1N sodium hydroxide. The number average molecular weight is obtained by the following formula: mol wt=gm material/ml of 0.1N NaOH×10,000. Due to the extreme insolubility of these condensation products, slight amounts of undissolved materials would give higher number average molecular weights by this method than the actual values.

The weight percent hydrolysis for each condensation or cocondensation product indicated in Tables I, II and III was determined by the following method:

Method for Determining % Hydrolysis

About 1 gm of condensation product is added to 100 ml of 2% Potassium Chloride (KCl) brine and the mixture held at a controlled temperature for various times. Then 10 ml aliquotes are taken and added to 60 ml of dimethyl formamide. This solution is titrated to neutral pH with 0.1N sodium hydroxide. The wt. % hydrolysis is calculated by the following formula: % hydrolysis=ml of 0.1N NaOH/gm wt of sample×6.25. The value of 6.25 corresponds to an hydroxy acetic acid tetramer with an equivalent average molecular weight of 62.5 per unit.

EXAMPLES

EXAMPLE 1—100% HYDROXYACETIC ACID (HAA)

A mixture of 400 lbs. net of 70% HAA and 0.04 lbs. (18 gms) of antimony trioxide were heated under nitrogen to 170° C. with removal of water at which time 30-60 mm vacuum was applied and the temperature increased to 200° C. with continued removal of condensation water. The reaction mixture was held about 6 hours at 200°-220° C. and then discharged and allowed to cool to a crystalline solid of 206° C. mp. Product weight was 208 lbs. The number average molecular weight was 606.

EXAMPLE 1A—POST-HEATING OF EXAMPLE 1

A sample of Example 1 was heated in a vacuum oven at 150° C. for 24 hours at 30-60 mm Hg vacuum. The melting point increased to 210°-211° C. and the number average molecular weight increased to 4,019.

EXAMPLE 2—8% LACTIC/92% HYDROXYACETIC ACID (LA/HAA)

A mixture of 376 lbs. net of 70% HAA, 26 lbs net of 88% LA and 18 gms. of antimony trioxide were heated under nitrogen and processed in a manner described in Example 1. A total of 211 lbs. of crystalline product was obtained, mp 185° C. The number average molecular weight was 226. After extraction of soluble monomer and dimer in the condensation product, the number average molecular weight was 303.

EXAMPLE 3—8% LACTIC/92% HYDROXYACETIC Acid (LA/HAA)

A mixture of 376 lbs. net of 70% HAA, 26 lbs. net of 88% lactic acid, and 18 gms. of antimony trioxide were heated under nitrogen to 167° C. with removal of water at which time 30-60 mm of vacuum was applied and the temperature increased to 170° C. with continued removal of condensation water. The reaction mixture was held three hours at 170°-180° C. and then discharged and allowed to cool to a crystalline solid of 172°-173° C. mp. Product weight was 216 lbs. The number average molecular weight was 193.

EXAMPLE 4—8% LACTIC/92% HYDROXYACETIC ACID (LA/HAA)

A mixture of 376 lbs. net of 70% HAA, 26 lbs. net of 88% lactic acid, and 18 gms. of antimony trioxide were heated under nitrogen to 167° C. with removal of water at which time 30-60 mm of vacuum was applied and the temperature increased to 170°° C. with continued removal of condensation water. The reaction mixture was held 2.75 hours at 170°-174° C. and then discharged and allowed to cool to a crystalline solid of about 160°-162° C. mp. Product weight was 217 lbs. The number average molecular weight was 151. The product was too soft to grind without using dry ice.

The degree of condensation and the percentages of cocondensing molecules both have an effect on the rate of hydrolysis. Table I shows the effect of switching from 100% HAA condensation products to those containing 8% LA/92%/HAA as well as the effect of condensations of 8%LA/92%HAA at shorter times and/or lower temperatures.

TABLE I

EFFECT OF TEMPERATURE & MOLECULAR WT. ON HYDROLYSIS 2% KCl BRINE CALCULATED HYDROLYSIS (WT. % HYDROLYZED)

| SAMPLE | 100° F. | 150° F. | 200° F. | MOL WT |
|---|---|---|---|---|
| @ 16 Hours | | | | |
| Example 1 | 6 | 17 | 41 | 606 |
| Example 2 | 14 | 29 | 61 | 226 |
| Example 3 | 10 | 32 | 73 | 193 |
| Example 4 | 17 | 41 | 82 | 151 |
| @ 40 Hours | | | | |
| Example 1 | Not Available | 28 | 53 | |
| Example 2 | Not Available | 42 | 67 | |
| Example 3 | Not Available | 60 | 80 | |
| Example 4 | Not Available | 60 | 92 (WAXY) | |
| @ 100 Hours | | | | |
| Example 1 | 15 | 38 | 67 | |
| Example 2 | 25 | 52 | 85 | |
| Example 3 | 28 | 61 | 100 | |
| Example 4 | 38 | 71 | 105 (WAXY) | |

From this Table it is apparent that addition of lactic acid to the hydroxyacetic acetic acid increased the rate of hydrolysis. Also carrying out the condensation at 180° C. for Example 3 versus 220° C. (Example 2) resulted in faster hydrolysis and lower number average molecular weight as did the slight decrease in the cycle time at 180° C. for Example 4 versus Example 3. However, with Example 4, the decrease in number average molecular weight was enough to prevent it from being grindable without using dry ice.

While the minimum number average molecular weight gave the fastest hydrolysis rates, further increases were still desired. Improvements were achieved by incorporating still bulkier molecules than lactic acid in the HAA condensation. Tables II and III show the effect of adding these molecules.

EXAMPLE 5—7% CITRIC/93% HYDROXYACETIC ACID (CA/HAA)

A mixture of 1630 gms. net of 70% HAA, 252 gms. CA, and 0.169 gms. of antimony trioxide were heated under nitrogen to 150° C. with removal of water at which time 30-60 mm Hg vacuum was applied and heating continued to 180° C. After 7.5 hours at 180°-190° C., the mixture was discharged and allowed to cool to give product of 170°-171° C. mp. The number average molecular weight was 177.

EXAMPLE 6—4% CITRIC/3% LACTIC/2% 2,2-(BISHYDROXYMETHYL)PROPANOIC ACID/91% HYDROXYACETIC ACID (CA/LA/BHMPA/HAA)

A mixture of 1646 gms. net of 70% HAA, 126 gms. CA, 54 gms. net of 88% LA, 40 gms BHMPA, and 0.169 gms. of antimony trioxide were heated under nitrogen to 150° C. with removal of water at which time 30-60 mm Hg vacuum was applied and heating continued to 180° C. After seven hours at 180° C., the mixture was discharged and allowed to cool to give product of 166°-168° C. mp. The number average molecular weight was 208.

EXAMPLE 6A—POST-HEATING OF EXAMPLE 6

Material of Example 6 was heated at 120° C. under 25 in. vacuum for 65 hours over a week-end to give crosslinking and higher molecular weight. The melting point rose to 172°-174° C. and the number average molecular weight was 608 after extraction of 2% by weight of unreacted monomer and soluble dimer.

7-5% ADIPIC/4% ETHYLENE GLYCOL/1% TRIMETHYLOLETHANE/90% HYDROXYACETIC ACID (AA/EG/TME/HAA)

A mixture of 1600 gms. net of 70% HAA, 108 gms. AA, 41 gms. EG, 12.3 gms. TME, and 0.169 gms. of antimony trioxide were heated under nitrogen to 150° C. with removal of water at which time 30—60 mm Hg vacuum was applied and heating continued to 180° C. After 6.5 hours at 180° C., the mixture was discharged and allowed to cool to give product of 165° C. mp. The number average molecular weight was 301.

EXAMPLE 8—4% CITRIC/4% LACTIC/92% HYDROXYACETIC ACID (CA/LA/HAA)

A mixture of 1646 gms. net of 70% HAA, 140 gms. CA, 68 gms. net of 88% LA, and 0.169 gms of antimony trioxide were heated under nitrogen to 150° C. with removal of water at which time 30-60 mm Hg vacuum was applied and heating continued to 180° C. After six hours at 180° C., the mixture was discharged and allowed to cool to give product of 172-173 mp. Number average molecular weight was 193.

TABLE II

2% KCl BRINE CALCULATED HYDROLYSIS (WT % HYDROLYZED) @ 190° F.

| SAMPLE | MP °C. | 16 HRS | 40 HRS | 100 HRS | MOL WT. |
|---|---|---|---|---|---|
| Example 1 | 206 | 37 | 44 | 59 | 606 |
| Example 2 | 185 | 53 | 60 | 74 | 226 |

TABLE II-continued
2% KCl BRINE CALCULATED HYDROLYSIS
(WT. % HYDROLYZED) @ 190° F.

| SAMPLE | MP °C. | 16 HRS | 40 HRS | 100 HRS | MOL WT. |
|---|---|---|---|---|---|
| Example 5 | 170 | 69 | 81 | 102 | 177 |
| Example 6 | 167 | 68 | 81 | 100 | 208 |
| Example 7 | 165 | 59 | 70 | 89 | 301 |
| Example 8 | 172 | 63 | 74 | 96 | 193 |

TABLE III
2% KCl BRINE CALCULATED HYDROLYSIS
(WT. % HYDROLYZED) @ 150° F.

| Sample | 16 Hr | 40 Hr | 100 Hr | 200 Hr |
|---|---|---|---|---|
| Example 1 | 17 | 28 | 38 | Not Avail. |
| Example 2 | 25 | 40 | 53 | 60 |
| Example 5 | 37 | 48 | 60 | 72 |
| Example 6 | 34 | 50 | 65 | 78 |
| Example 7 | 26 | 43 | 58 | 67 |
| Example 8 | 34 | 48 | 57 | 72 |

The weight-percent-hydrolysis values of Tables I, II and III are based on an assumed molecular weight of the condensation products of 62.5 per condensation unit. Since the 62.5 is only an approximation, the percent hydrolysis is also an approximation of the plugging/unplugging character of the condensation product. A more rigorous method of measuring the amount of condensation product solubilized at a given temperature in a given time is the isolation technique described below. This technique does not require assuming a molecular weight and also shows the amount of unreacted monomer and soluble dimer present in the condensation product. The unreacted monomer and soluble dimer would be ineffective in plugging and thus should be discounted when determining the plugging/unplugging character of the treatment agent. See Tables IV, V and VI.

Method for Determining % Solubilization by Isolation

About 1 gm of condensation product is added to 25 ml of 2% weight KCl brine or 15 weight % HCl and the mixture is held at a controlled temperature for various times. Then the cooled mixture is filtered and the isolated solid is washed with 10 ml of water followed by drying. The solid (and tared filter paper) is dried in vacuum at 65°-70° C. The amount of undissolved material is compared with the original weight.

TABLE IV
WT. % SOLUBILIZED (BY ISOLATION)
2% KCl BRINE @ 190° F. (except as noted)

| SAMPLE | 1 HR @ ROOM TEMP. | 16 HRS | 40 HRS | 100 HRS | 200 HRS |
|---|---|---|---|---|---|
| Example 1 | 10.5 | 39.0 | 62.5 | 78.7 | 97.1 |
| Example 1B | 2.7 | 30.3 | 55.3 | 73.0 | 94.2 |
| Example 6 | 41.7 | 99.4 | 100.0 | — | — |
| Example 6A | 2.1 | 82.5 | 92.0 | 100.0 | — |

TABLE V
WT. % SOLUBILIZED (BY ISOLATION)
In 2% KCl BRINE @ 150° F.

| SAMPLE | 16 HRS | 40 HRS | 100 HRS | 200 HRS |
|---|---|---|---|---|
| Example 1 | 26.7 | 27.4 | 26.4 | 38.4 |
| Example 1A | 15.4 | 17.0 | 26.4 | 30.6 |
| Example 6 | 62.0 | 69.0 | 79.0 | 91.0 |
| Example 6A | 49.0 | 53.7 | 62.8 | 75.8 |

TABLE VI
WT. % SOLUBILIZED (BY ISOLATION)
In 15% HCl @ 150° F. (except as noted)

| SAMPLE | 1 HR AT ROOM TEMP. | 2 HRS | 4 HRS |
|---|---|---|---|
| Example 1 | 10.5 | 39.9 | 50.6 |
| Example 1A | 2.7 | 27.0 | 42.2 |
| Example 6 | 31.4 | 67.8 | 97.4 |
| Example 6A | 4.3 | 52.8 | 93.2 |

Table IV, V and VI show the result of post heating which increases the number average molecular weight. The data after one hour at room temperature are an indication of the unreacted monomer and soluble dimer that will not have a plugging effect. A substantial reduction occurs upon post heating. The remaining data show the post-heated material solubilizing slower at a given temperature in both 2% KCl brine and 15% HCl.

Those skilled in the art will recognize variations that can be made to accommodate different wellbore conditions and time constraints. These are in the range of equivalents of the invention set forth in the appended claims.

We claim:

1. A wellbore fluid for reducing the permeability of a subterranean formation penetrated by a wellbore comprising a fluid having dispersed therein a sufficient amount of a treatment agent for successful fluid control, said treatment agent comprising discrete solid structures of a condensation product of hydroxyacetic acid with up to 15 wt. % cocondensing compounds containing other hydroxy-, carboxylic-acid-, or hydroxycarboxylic acid moieties, said condensation product having a number average molecular weight of about 200 to 4000, being substantially crystalline at both ambient and wellbore temperatures and having a melting point of about 160° or higher and sufficiently high to avoid softening or melting during use and being substantially insoluble in said wellbore fluid and degradable in the presence of water at elevated temperature to monomers and dimers which are at least partially soluble in oil or water.

2. The wellbore fluid of claim 1, wherein the condensation product is an oligomer with a number average molecular weight of about 200 to 650.

3. The wellbore fluid of claim 2 wherein the condensation product comprises trimers up through decamers.

4. The wellbore fluid of claim 1, wherein the cocondensing compound is lactic acid, citric acid, adipic acid, trimethylol-ethane, or 2,2-(bishydroxymethyl)-propanoic acid.

5. The wellbore fluid of claim 1, wherein the cocondensing compound is lactic acid or citric acid.

6. A method for reducing the premeability of a subterranean formation penetrated by a wellbore comprising:

dispersing a sufficient amount of a treatment agent for successful fluid control, said treatment agent comprising discrete solid structures of a condensation product of hydroxyacetic acid with up to 15 wt. % cocondensing compounds containing other hydroxy-, carboxylic-acid-, or hydroxycarboxylic acid moieties into a wellbore fluid, the condensation product having a number average molecular weight of about 200 to 4000, being substantially crystalline at both ambient and wellbore temperatures and having a melting point of about 160° or higher and sufficiently high to avoid softening or melting during use and being substantially insoluble in the wellbore fluid and degradable in the presence of water at elevated temperatures to monomers and dimers which are at least partially soluble in oil or water and placing the wellbore fluid containing the solid structures into the wellbore.

7. The method of claim 6 wherein the condensation product is an oligomer having a number average molecular weight of about 200 to 650.

8. The method of claim 6 wherein the cocondensing compound is lactic acid, citric acid, adipic acid, trimethylol-ethane, or 2,2-(bishydroxymethyl)propanoic acid.

9. The method of claim 6 wherein the cocondensing compound is lactic acid or citric acid.

10. The method of claim 6 wherein the condensation product comprises trimers through decamers.

11. A method for reducing the permeability of a subterranean formation penetrated by a wellbore comprising the following steps:
  (a) determining temperature of the well,
  (b) selecting a solid structure of a condensation product of hydroxy acetic acid with up to 15 wt. % cocondensing compounds containing other hydroxy-, carboxylic-acid-, or hydroxycarboxylic acid moieties, the condensation product having a number average molecular weight of about 200 to 4000, being substantially crystalline at both ambient and wellbore temperatures and having a melting point of about 160° or higher and sufficiently high to avoid softening or melting during use and being substantially insoluble in the wellbore fluid and degradable in the presence of water at the temperature of step (a) to monomers and dimers which are at least partially soluble in oil or water,
  (c) dispersing a sufficient amount of the solid structure of step (b) for successful fluid control in a wellbore fluid, and
  (d) placing the wellbore fluid containing the solid structure of step (b) into the wellbore.

12. The method of claim 11 wherein the condensation product is an oligomer having a number average molecular weight of about 200 to 650.

13. The method of claim 11 wherein the temperature of the well is greater than about 200° F. and the condensation product of step (b) is the condensation product of hydroxy acetic acid alone.

14. The method of claim 6 wherein the solid structures have a size from about 0.1 to 1500 microns.

15. The method of claim 11 wherein the solid structures have a size from about 0.1 to 1500 microns.

16. The method of claim 6 wherein the solid structures are dispersed in the wellbore fluid at a concentration of about 1 to about 10 pounds per hundred barrels of wellbore fluid.

17. The method of claim 11 wherein the solid structures are dispersed in the wellbore fluid at a concentration of about 1 to about 10 pounds per hundred barrels of wellbore fluid.

* * * * *